United States Patent
Mehta et al.

(10) Patent No.: US 10,535,084 B1
(45) Date of Patent: Jan. 14, 2020

(54) SYSTEM AND METHOD FOR PROVIDING CONTENT ITEMS WITH FORMAT ELEMENTS

(71) Applicant: Google LLC, Mountain View, CA (US)

(72) Inventors: Aranyak Mehta, Sunnyvale, CA (US); Omkar Muralidharan, Sunnyvale, CA (US); Bartholomew Furrow, Mountain View, CA (US); Christopher Davis Monkman, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 152 days.

(21) Appl. No.: 15/894,367

(22) Filed: Feb. 12, 2018

Related U.S. Application Data

(63) Continuation of application No. 14/462,036, filed on Aug. 18, 2014, now Pat. No. 9,892,430.

(60) Provisional application No. 62/030,352, filed on Jul. 29, 2014.

(51) Int. Cl.
*G06Q 30/02* (2012.01)
*G06F 16/9535* (2019.01)

(52) U.S. Cl.
CPC ..... *G06Q 30/0275* (2013.01); *G06F 16/9535* (2019.01)

(58) Field of Classification Search
CPC .................................................. G06Q 30/02
See application file for complete search history.

(56) References Cited

U.S. PATENT DOCUMENTS

| | | |
|---|---|---|
| 2002/0026459 A1 | 2/2002 | Fernandez |
| 2003/0055729 A1 | 3/2003 | Bezos et al. |
| 2007/0073756 A1 | 3/2007 | Manhas et al. |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0358301 A1 | 12/2017 | Raitio et al. |

OTHER PUBLICATIONS

"Walmart and Google to offer voice-enabled shopping", BBC News, Aug. 23, 2017 (10 pages).
Abrams, Help users find, interact & re-engage with your app on the Google Assistant, Google Developers Blog, Nov. 15, 2017, 16 pages.

(Continued)

*Primary Examiner* — Vincent M Cao
(74) *Attorney, Agent, or Firm* — Foley & Lardner LLP; James De Vellis

(57) ABSTRACT

According to at least one aspect, a method for providing content items augmented with format elements includes receiving a request for a content item and generating a plurality of augmented content items based on a plurality of original content items and a plurality of format elements. In a first stage a first content item associated with a first original content item is selected based on normalized auction scores of the content items. In a second stage, a set of content items associated with the first original content item is identified. Selection scores for the content items in the identified set are computed based on respective normalization parameters. A second content item is selected from the identified set based on the selection scores and a bid amount. The second content item is then provided for display to a user.

20 Claims, 4 Drawing Sheets

(56) References Cited

OTHER PUBLICATIONS

Albrecht, "Alexa, How Can You Be Used in Restaurants?", the spoon, Dec. 10, 2017, 6 pages.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant, BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.
U.S. Notice of Allowance for U.S. Appl. No. 14/462,036 dated Sep. 26, 2017 (9 pages).
U.S. Office Action for U.S. Appl. No. 14/462,036 dated Apr. 4, 2017 (9 pages).
Willens, Max, "For publishers, Amazon Alexa holds promise but not much money (yet)", Digiday, Jul. 6, 2017 (6 pages).

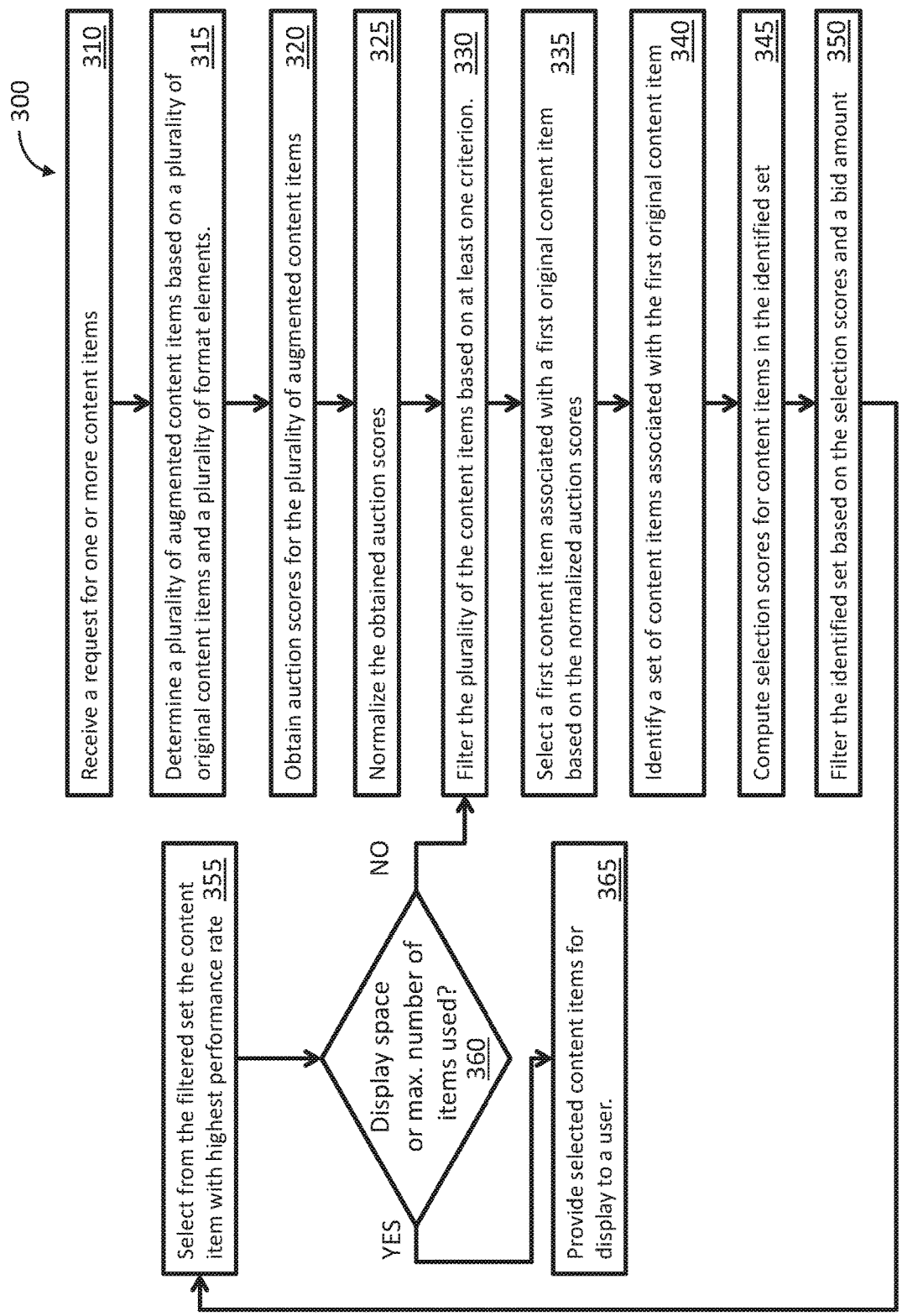

SYSTEM AND METHOD FOR PROVIDING CONTENT ITEMS WITH FORMAT ELEMENTS

CROSS-REFERENCE TO RELATED PATENT APPLICATIONS

This application claims the benefit of priority under 35 U.S.C. § 120 to U.S. patent application Ser. No. 14/462,036, titled "System and Method for Providing Content Items with Formal Elements", filed Aug. 18, 2014 and issued Feb. 13, 2018 as U.S. Pat. No. 9,892,430, which claims the benefit of priority to U.S. Provisional Application No. 62/030,352, filed Jul. 29, 2014, each of which is hereby incorporated herein by reference in its entirety.

BACKGROUND

In a networked environment, such as the Internet or other networks, first-party content providers can provide information for public presentation on resources, for example webpages, documents, applications, and/or other resources. The first-party content can include text, video, and/or audio information provided by the first-party content providers via, for example, a resource server for presentation on a client device over the Internet. The first-party content may be a webpage requested by the client device or a stand-alone application (e.g., a video game, a chat program, etc.) running on the client device. Additional third-party content can also be provided by third-party content providers for presentation on the client device together with the first-party content provided by the first-party content providers. For example, the third-party content may be a public service announcement or advertisement that appears in conjunction with a requested resource, such as a webpage (e.g., a search result webpage from a search engine, a webpage that includes an online article, a webpage of a social networking service, etc.) or with an application (e.g., an advertisement within a game). Thus, a person viewing a resource can access the first-party content that is the subject of the resource as well as the third-party content that may or may not be related to the subject matter of the resource.

SUMMARY

Implementations described herein relate to selecting and providing for display content items augmented with format elements.

One implementation relates to a method for providing content items for presentation to users. The method includes receiving, by a processor, a request for a content item. The processor has access to a plurality of original content items. Each of the plurality of content items is associated with a bid amount and a plurality of format elements. The processor can determine a plurality of augmented content items. Each augmented content item includes one of the plurality of original content items and at least one format element. Each augmented content item is associated with an auction score. The processor can normalize, for each of the augmented content items, the respective auction score based on a normalization parameter dependent on at least one format element in the augmented content item. The processor can then select a first content item, among the original and augmented content items, based on the normalized auction scores. The first content item is associated with a first original content item. The processor can identify a set of content items associated with the first original content item and select from the identified set an eligible content item based on normalization parameters associated with content items in the identified set. The processor can then provide to a requesting entity for display the first original content item with any format indicated by any format element in the selected eligible content item.

Another implementation relates to a system for providing content items for presentation to users. The system may include one or more processors and one or more storage devices. The one or more storage devices store a plurality of original content items. Each original content item is associated with a bid amount and a plurality of format elements. The one or more storage devices also include instructions that cause the one or more processors to perform several operations. The operations include receiving a request for a content item and determining a plurality of augmented content items. Each augmented content item includes one of the plurality of original content items and at least one format element. Each augmented content item is associated with an auction score. The operations also include normalizing, for each of the augmented content items, the respective auction score based on a normalization parameter dependent on at least one format element in the augmented content item and selecting a first content item, among the original and augmented content items, based on the normalized auction scores. The first content item is associated with a first original content item. The operations also include identifying a set of content items associated with the first original content item and selecting from the identified set an eligible content item based on normalization parameters associated with content items in the identified set. The operations also include providing to a requesting entity for display the first original content item with any format indicated by any format element in the selected eligible content item.

Yet a further implementation relates to a computer readable storage device storing instructions that, when executed by one or more processors, cause the one or more processors to perform several operations. The operations may include receiving a request for a content item and determining a plurality of augmented content items based on a plurality of original content items and a plurality of format elements. Each augmented content item includes one of the plurality of original content items and at least one format element. Each augmented content item is associated with an auction score. The operations also include normalizing, for each of the augmented content items, the respective auction score based on a normalization parameter dependent on at least one format element in the augmented content item and selecting a first content item, among the original and augmented content items, based on the normalized auction scores. The first content item is associated with a first original content item. The operations also include identifying a set of content items associated with the first original content item and selecting from the identified set an eligible content item based on normalization parameters associated with content items in the identified set. The operations also include providing to a requesting entity for display the first original content item with any format indicated by any format element in the selected eligible content item.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 3 is a flow diagram illustrating a method for providing a content item.

Figure 1:
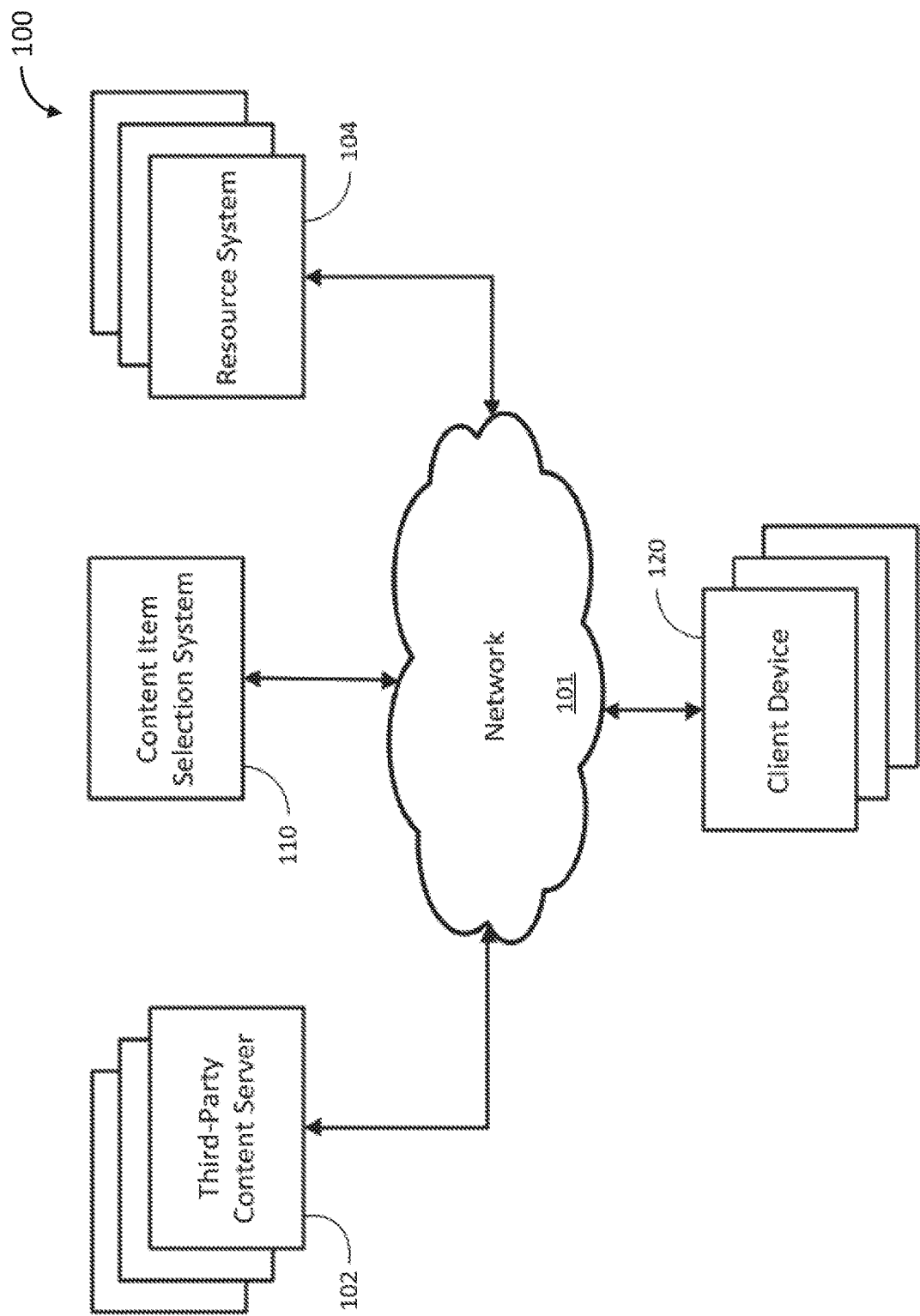
FIG. 1 is an overview depicting an implementation of a system of providing information via a computer network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Examples of specific implementations and applications are provided primarily for illustrative purposes.

A computing device (e.g., a client device) can view a resource, such as a webpage, a document, an application, etc. In some implementations, the computing device may access the resource via the Internet by communicating with a server, such as a webpage server, corresponding to that resource. The resource includes first-party content that is the subject of the resource from a first-party content provider and may also include additional third-party provided content, such as advertisements or other content. In one implementation, responsive to receiving a request to access a webpage, a webpage server and/or a client device can communicate with a data processing system, such as a content item selection system, to request a content item to be presented with the requested webpage, such as through the execution of code of the resource to request a third-party content item to be presented with the resource. The content item selection system can select a third-party content item and provide data to effect presentation of the content item with the requested webpage on a display of the client device. In some instances, the content item is selected and served with a resource associated with a search query response. For example, a search engine may return search results on a search results webpage and may include third-party content items related to the search query in one or more content item slots of the search results webpage.

The computing device (e.g., a client device) may also be used to view or execute an application, such as a mobile application. The application may include first-party content that is the subject of the application from a first-party content provider and may also include additional third-party provided content, such as advertisements or other content. In one implementation, responsive to use of the application, a resource server and/or a client device can communicate with a data processing system, such as a content item selection system, to request a content item to be presented with a user interface of the application and/or otherwise. The content item selection system can select a third-party content item and provide data to effect presentation of the content item with the application on a display of the client device.

In some instances, a device identifier may be associated with the client device. The device identifier may be a randomized number associated with the client device to identify the device during subsequent requests for resources and/or content items. In some instances, the device identifier may be configured to store and/or cause the client device to transmit information related to the client device to the content item selection system and/or resource server (e.g., values of sensor data, a web browser type, an operating system, historical resource requests, historical content item requests, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the content item selection system in an auction to select and serve content items for presentation with a resource. For example, a third-party content provider may place a bid in the auction that corresponds to an agreement to pay a certain amount of money if a user interacts with the provider's content item (e.g., the provider agrees to pay $3 if a user clicks on the provider's content item). In other examples, a third-party content provider may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the content item selection system uses content item interaction data to determine the performance of the third-party content provider's content items. For example, users may be more inclined to click on third-party content items on certain webpages over others. Accordingly, auction bids to place the third-party content items may be higher for high-performing webpages, categories of webpages, and/or other criteria, while the bids may be lower for low-performing webpages, categories of webpages, and/or other criteria.

In some instances, one or more performance metrics for the third-party content items may be determined and indications of such performance metrics may be provided to the third-party content provider via a user interface for the content item management account. For example, the performance metrics may include a cost per impression (CPI) or cost per thousand impressions (CPM), where an impression may be counted, for example, whenever a content item is selected to be served for presentation with a resource. In some instances, the performance metric may include a click-through rate (CTR), defined as the number of clicks on the content item divided by the number of impressions. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), and/or other performance metrics may be used.

In some instances, a webpage or other resource (such as, for example, an application) includes one or more content item slots in which a selected and served third-party content item may be displayed. The code (e.g., JavaScript®, HTML, etc.) defining a content item slot for a webpage or other resource may include instructions to request a third-party content item from the content item selection system to be presented with the webpage. In some implementations, the code may include an image request having a content item request URL that may include one or more parameters (e.g., /page/contentitem?devid=abc123&devnfo=A34r0). Such parameters may, in some implementations, be encoded strings such as "devid=abc123" and/or "devnfo=A34r0."

The selection of a third-party content item to be served with the resource by a content item selection system may be based on several influencing factors, such as a predicted click through rate (pCTR), a predicted conversion rate (pCVR), a bid associated with the content item, etc. Such influencing factors may be used to generate a value, such as a score, against which other scores for other content items may be compared by the content item selection system through an auction.

During an auction for a content item slot for a resource, such as a webpage, several different types of bid values may be utilized by third-party content providers for various third-party content items. For example, an auction may include bids based on whether a user clicks on the third-party content item, whether a user performs a specific action based on the presentation of the third-party content item, whether the third-party content item is selected and served, and/or other types of bids. For example, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid and/or adjusted for other reasons. For example, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or a normalized value, may be generated to be used in the auction based on the bid value and the probability or another modifying value. In the prior example, the value or score for a bid based on whether the third-party content item is selected and served may be $0.005*1.00=0.005 and the value or score for a bid based on whether a user performs a specific action may be $5*0.002=0.01. To maximize the income generated, the content item selection system may select the third-party content item with the highest value from the auction. In the foregoing example, the content item selection system may select the content item associated with the bid based on whether the user performs the specific action due to the higher value or score associated with that bid.

Once a third-party content item is selected by the content item selection system, data to effect presentation of the third-party content item on a display of the client device may be provided to the client device using a network.

While the foregoing has provided an overview of providing third party content items with requested first party content, processes and computer systems described in the current disclosure allow providing third party content items with added format elements for display and accounting for the added formats in the auction process.

FIG. 1 is a block diagram of an implementation of a system 100 for providing information via at least one computer network such as the network 101. The network 101 may include a local area network (LAN), wide area network (WAN), a telephone network, such as the Public Switched Telephone Network (PSTN), a wireless link, an intranet, the Internet, or combinations thereof. The system 100 can also include at least one data processing system, such as a content item selection system 110. The content item selection system 110 can include at least one logic device, such as a computing device having a data processor, to communicate via the network 101, for example with a resource server 104, a client device 120, and/or a third-party content server 102. The content item selection system 110 can include one or more data processors, such as a content placement processor, configured to execute instructions stored in a memory device to perform one or more operations described herein. In other words, the one or more data processors and the memory device of the content item selection system 110 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor may process instructions and output data to effect presentation of one or more content items to the resource server 104 and/or the client device 120. In addition to the processing circuit, the content item selection system 110 may include one or more databases configured to store data. The content item selection system 110 may also include an interface configured to receive data via the network 101 and to provide data from the content item selection system 110 to any of the other devices on the network 110. The content item selection system 110 can include a server, such as an advertisement server or otherwise.

The client device 120 can include one or more devices such as a computer, laptop, desktop, smart phone, tablet, personal digital assistant, set-top box for a television set, a smart television, or server device configured to communicate with other devices via the network 101. The device may be any form of portable electronic device that includes a data processor and a memory. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The client device 120 can execute a software application (e.g., a web browser or other application) to retrieve content from other computing devices over the network 101. Such an application may be configured to retrieve first-party content from a resource server 104. In some cases, an application running on the client device 120 may itself be first-party content (e.g., a game, a media player, etc.). In one implementation, the client device 120 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 101 referred to by the URL address (e.g., a resource server 104). The other device may then provide web page data, geographic map data, and/or other data to the client device 120, which causes visual indicia to be displayed by the display of the client device 120. Accordingly, the browser window displays the retrieved first-party content, such as web pages from various websites, to facilitate user interaction with the first-party content.

The resource server 104 can include a computing device, such as a server, configured to host a resource, such as a web page or other resource (e.g., articles, comment threads, music, video, graphics, search results, information feeds, geographic map data, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 120 can access the resource server 104 via the network 101 to request data to effect presentation of a resource of the resource server 104.

One or more third-party content providers may have third-party content servers 102 to directly or indirectly provide data for third-party content items to the content item selection system 110 and/or to other computing devices via network 101. The content items may be in any format that may be presented on a display of a client device 120, for example, graphical, text, image, audio, video, etc. The content items may also be a combination (hybrid) of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc. In some instances, the third-party content servers 102 may be integrated into the content item selection system 110 and/or the data for the third-party content items may be stored in a database of the content item selection system 110.

In one implementation, the content item selection system 110 can receive, via the network 101, a request for a content item to present with a resource. The received request may be received from a resource server 104, a client device 120, and/or any other computing device. The resource server 104 may be owned or ran by a first-party content provider that may include instructions for the content item selection system 110 to provide third-party content items with one or more resources of the first-party content provider on the resource server 104. In one implementation, the resource may include a web page, geographic map data, and/or the like. The client device 120 may be a computing device operated by a user (represented by a device identifier), which, when accessing a resource of the resource server 104, can make a request to the content item selection system 110 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, etc.). The information that the content item selection system 110 receives can include a HyperText Transfer Protocol (HTTP) cookie which contains a device identifier (e.g., a random number) that represents the client device 120. In some implementations, the device information and/or the resource information may be appended to a content item request URL (e.g., contentitem.item/page/contentitem?devid=abc123&devnfo=A34r0). In some implementations, the device information and/or the resource information may be encoded prior to being appended the content item request URL. The requesting device information and/or the resource information may be utilized by the content item selection system 110 to select third-party content items to be served with the requested resource and presented on a display of a client device 120.

In some instances, a resource of a resource server 104 may include a search engine feature. The search engine feature may receive a search query (e.g., a string of text) via an input feature (an input text box, etc.). The search engine may search an index of documents (e.g., other resources, such as web pages, etc.) for relevant search results based on the search query. The search results may be transmitted as a second resource to present the relevant search results, such as a search result web page, on a display of a client device 120. The search results may include web page titles, hyperlinks, etc. One or more third-party content items may also be presented with the search results in a content item slot of the search result web page. Accordingly, the resource server 104 and/or the client device 120 may request one or more content items from the content item selection system 110 to be presented in the content item slot of the search result web page. The content item request may include additional information, such as the user device information, the resource information, a quantity of content items, a format for the content items, the search query string, keywords of the search query string, information related to the query (e.g., geographic location information and/or temporal information), etc. In some implementations, a delineation may be made between the search results and the third-party content items to avert confusion.

In some implementations, the third-party content provider may manage the selection and serving of content items by the content item selection system 110. For example, the third-party content provider may set bid values and/or selection criteria via a user interface that may include one or more content item conditions or constraints regarding the serving of content items. A third-party content provider may specify that a content item and/or a set of content items are to be selected and served for user devices 120 having device identifiers associated with a certain geographic location or region, a certain language, a certain operating system, a certain web browser, etc. In another implementation, the third-party content provider may specify that a content item or set of content items are to be selected and served when the resource, such as a web page, document, etc., contains content that matches or is related to certain keywords, phrases, etc. The third-party content provider may set a single bid value for several content items, set bid values for subsets of content items, and/or set bid values for each content item. The third-party content provider may also set the types of bid values, such as bids based on whether a user clicks on the third-party content item, whether a user performs a specific action based on the presentation of the third-party content item, whether the third-party content item is selected and served, and/or other types of bids.

While the foregoing has provided an overview of a system 100 for selecting and serving content items to client devices 120, examples of presenting third party content items with format elements will now be described in reference to FIGS. 2A and 2B. Third party content can be provided and presented with added format elements.

Figure 2A:
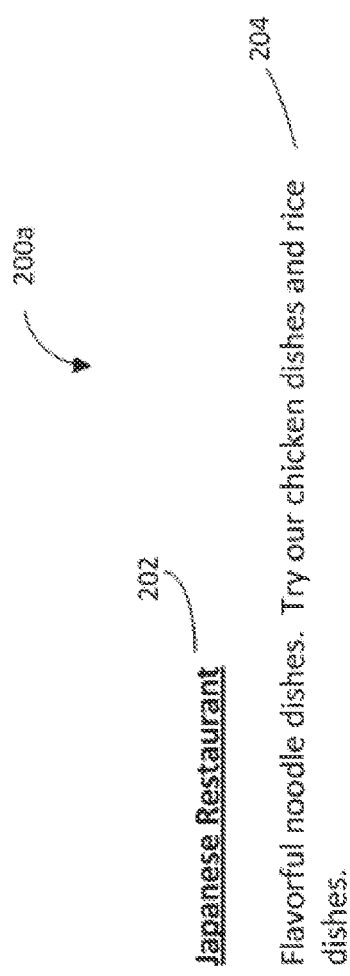
FIG. 2A depicts an illustrative implementation of a content item.

FIG. 2A depicts an implementation of a content item 200a. The content item 200a includes a headline 202 and text 204.

The content item 200a represents a third-party content item as originally created. In other words, no additional format elements were added to the content item 200a. The content item 200a includes a headline 202 indicative of a business or service such as a Japanese restaurant, and a text 204 providing an overview of the business or service indicated in the headline 202. In some implementations, the content item 200a may include an image, an audio segment, a video segment, or other media content. The content item 200a may be a candidate content item for a content auction. If successful in the auction, the content item 200a may be displayed to a user. For instance, the content item 200a may be presented with search results in response to a search query by the user.

An objective of a content provider is to provide relevant and high quality third-party content items to users. Relevant and high quality third-party content items are more likely to trigger user interaction. Achieving high user interaction for a given third-party content item can increase the revenue for the content provider and lead to satisfaction of the third-party content owner. In some implementations, the content provider can augment a third-party content item provided by a respective owner with one or more format elements to enhance respective content quality and relevance to users. In some implementations, a format element added to a content item can include additional information related to the content item to direct a receiving user to engage with the content item. In some implementations, a format element can include media content not necessarily related to the content item. In the following, a content item augmented with one or more format elements is referred to as an augmented content item whereas a non-augmented content item is referred to as an original content item. The term content item can refer to an original content item or an augmented content item.

Figure 2B:
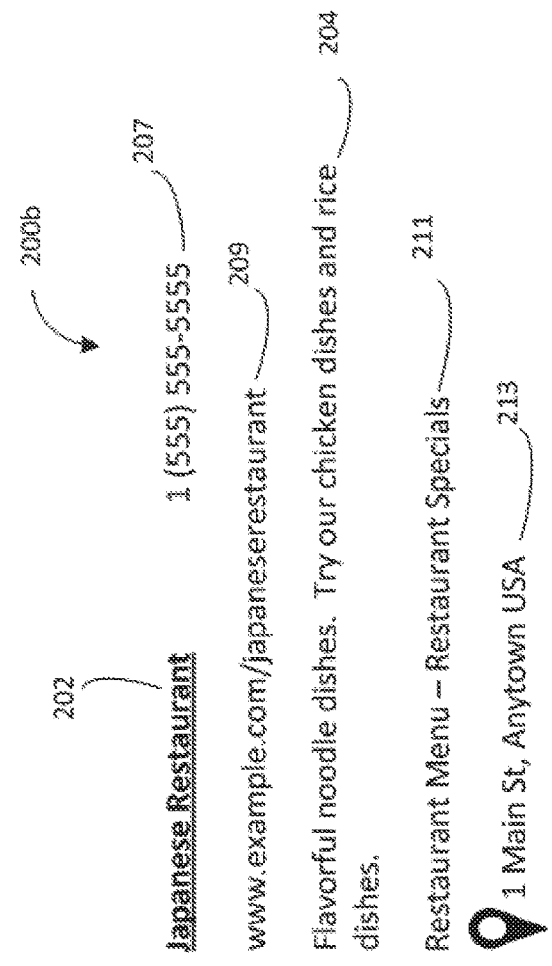
FIG. 2B depicts an illustrative implementation of a content item with including a format element.

FIG. 2B depicts an implementation of an augmented content item 200b. The augmented content item 200b represents an augmented version of the content item 200a. The augmented content item 200b includes a headline 202, text 204, and format elements 207, 209, 211, and 213. The headline 202 and text 204 are the same as in the content item 200a.

Compared to the content item 200a, the augmented content 200b item further includes the format elements 207, 209, 211, and 213. The format element 207 includes a telephone number associated with the content item 200a. For instance, the telephone number in the format element 207 can be a telephone number of the business (or service) indicated by the headline 202. The format element 209 includes a hyperlink of a landing web page or a home web page associated with the content item. For instance, the hyperlink can be a link to the home web page of the business (or service) indicated by the headline 202. The format element 211 includes a hyperlink to a landing web page associated with the content item such as a hyperlink to a restaurant menu. The format element 213 includes a link to a geographic map associated with the content item. The geographic map can indicate of a location of the business indicated by the headline 202. Although the augmented content item 200b depicted in FIG. 2B includes multiple format elements, it should be understood that an augmented content item 200b may include one or many format elements.

The format elements 207, 209, 211, and 213 of the augmented content item 200b are provided for illustration purposes. Other format elements may include media content such as an image, an audio segment, a video segment, graphics, the like, or a combination thereof. The media content may or may not be related to an original content item such as the content item 200a. For instance, a format element may include audio or visual effects independent of any content item to attract the attention of a user when displayed. A format element may also include information about an offer, a promotion, or a publication related to an original content item such as the content item 200a.

Augmented content items such the augmented content item 200b may be candidates for a content auction. In some implementations, when a user of a client device 120 sends a query for one or more resources to the resource system 104, the content item selection system 110 may be triggered to select one or more content items for presenting to the user with the requested resource(s). The selected content items are usually displayed within a defined display space of a requested resource (such as a requested web page or a page including search results). The content item selection system 110 can be configured to select the content items for presenting to the user from a plurality of content items including original content items (such as the content item 200*a*) and respective augmented content items (such as the augmented content item 200*b*). The selection of such content items is performed by an auction process executed by the content item selection system 110.

The format elements added to content items can be viewed as added-value in the resulting augmented content items. The augmented content items are usually expected to have better quality and/or improved performance. Adding a format element may change the ranking (or value) of the content item in a content item auction, because of the additional information (or effects) provided to a user. The altered ranking of the content item may be measured by assessing the performance metrics of the content item. For example, if the content item displays on a search results page, it may garner more clicks due to a respective added format element. The content item becomes more useful to both users and content item providers. The display of the content item with the format element can be implemented to increase the value to the user and the owner of the content item and boost the revenue of the content provider.

The auction process can be configured to determine (1) which content items (among original and augmented content items) are to be displayed in the available space within the requested resource and (2) how to price each augmented content item or added format elements therein.

The selection of content items by the auction process can be constrained by one or more criteria. First, content items may be selected based on content of the requested resource, keywords in a search query, personal information of the user (such as user preferences, user interest based on collected data, a location associated with the user, and/or the like), and/or other criteria. Second, the cumulative size of the selected content items is constrained by the size of the space available for displaying the content items in the requested resource. Also, the maximum number of content items that can be selected may be constrained by an upper bound number. Third, for any selected content item (either original or augmented content item), the respective price to be charged may be bounded by a bid amount associated with (for instance set by an owner of) the content item.

In terms of the pricing, the content provider (associated for instance with the resource system 104 and/or the content item selection system 110) would like the system to implement a "pay-for-prominence" property. For instance, the CPC for a content item is expected to be higher if it shows a more prominent or effective format. The auction process can be configured to meet the objectives of (1) enhancing efficiency (the total auction score of the content item and respective added format elements shown), (2) increasing revenue, and (3) increasing content owners' profitability by improving the performance rates and boosting quality of clicks.

FIG. 3 is a flow diagram illustrating a process 300 of providing content items according to some implementation. The process 300 includes receiving a request for one or more content items for presenting to a user (block 310), determining a plurality of augmented content items based on a plurality of original content items and a plurality of format elements (block 315), obtaining auction scores for the plurality of content items (block 320), normalizing the obtained auction scores (block 325), filtering the plurality of content items based on at least one criterion (block 330), selecting among the filtered augmented content items the augmented content item with highest normalized score (block 335), identifying a set of content items including the same original content item as the selected augmented content item (block 340), computing selection scores for the content items in the identified set (block 345), filtering the identified set based on the selection scores and a bid amount (block 350), selecting the content item with the highest performance rate among the filtered set (block 355), looping back to the process block 335 until all available display space is used or a number of selected content items has been reached (decision block 360), and providing the selected content items for presenting to a user (block 365).

The process 300 includes receiving a request for one or more content items for presenting to a user (block 310). In some implementations, the content item selection system 110 can receive such request from the resource system 104 or directly from a client device 120. The request can specify the size of display space available within a resource (such as web page, a page including search results, a page including a map view, or any other resource) to display the requested content items or a number of requested content items. The requested content items can be displayed in a dedicated area of the resource. The request may further specify a theme for the requested content items. The theme may be determined based on content of the requested resource, keywords of a search query, personal information of the user (such as user preferences, user interest based on collected data, a location associated with the user, and/or the like), and/or other factors. The content item selection system 110 has access to a plurality of original content items. Each of the plurality of original content items is associated with a plurality of format elements.

The process 300 includes determining a plurality of augmented content items (block 315). In some implementations, the content item selection system 110 may identify a subset of the plurality of original content items based on a theme specified in the received request. The theme may be indicative of a type of products (such as smart phones, cars, books, etc.), a type of services (such as restaurants, car rental, travel services, etc.), touristic places to visit, or the like. In other implementations, the content item selection system 110 may not identify the subset and instead consider the plurality of original content items when determining the augmented content items. For each original content item (of the plurality of original content items or in the identified subset), the content item selection system 110 determines a respective set of augmented content items by considering possible combinations of format elements that can be added to the original content item. An augmented content item can include one or more format elements. The possible combinations of format elements for a given original content item can be identified based on format elements having information associated with the original content item, format elements that do not spatially overlap within a respective augmented content item, format element that do not result in conflicting audio or visual effects, or other criteria. At this stage, determining the plurality of augmented content items may not involve creating the augmented content items but rather identifying the possible combinations of format elements for each original content item.

The process 300 includes obtaining auction scores for the plurality of content items (block 320). In some implementations, the auction score for an augmented content item depends on the format element(s) included therein. The auction score for an augmented content item associated with a respective original content item can be formulated as a function of the performance rate of the original content item, the change in the performance rate due the added format element(s), a bid amount, and/or other parameters related to the added format element(s). For instance, if the predicted click-through rate (pCTR) is used as the performance rate, the auction score can be defined as Score (augmented content item)=f (pCTR, pCTR_lift, bid, x), where Score refers to the auction score, f is the function, pCTR_lift represents the change in pCTR due to the added format element(s), bid represents the bid amount set by the owner of the original content item, and x represents any other parameters related to the added format element(s). A person of ordinary skill in the art should appreciate that the auction score can be defined differently for distinct content provider. The content item selection system 110 can either compute the auction scores or retrieve them from a database if such scores are pre-computed and stored in the database. The content item selection system 110 can obtain the auction scores for only the augmented content items or for both augmented and original content items. The auction scores for an original content item can be formulated as Score (original content item)=f (pCTR, bid).

The process 300 includes normalizing the obtained auction scores (block 325). The auction score for each augmented content item can be normalized with a normalization parameter that depends on the format elements included in the augmented content item. In some implementations, the display space associated with an augmented content item can vary based on the added format element(s) included therein. Also, the amount of data (for instances in bits) associated with an augmented content item depends on the respective format elements included therein. The auction scores can be normalized in a way to allow for a comparison that takes into account the effect of added format elements among the plurality of augmented content items (also between original and augmented content items). In some implementations, the normalization parameters can be defined based on the display space (such as number of pixels) associated with each content item (original or augmented), the amount of data (such as in bits) associated with each content item (original or augmented), or any other feature of the content items that depends of added format elements. The normalization can be implemented using a division (or multiplication) of the auction scores with the respective normalization parameters or using another mathematical function. The normalization can be applied to augmented and original content items. In some implementations, the normalization parameters can be defined based on user interaction rates associated with the respective content items.

The process 300 includes filtering the plurality of content items based on at least one criterion (block 330). The content items can be filtered based on the respective display spaces, the respective data size (for instance in bits), or any other criterion. The filtering can be performed using thresholds, heuristics, or other approaches. The filtering can be applied either only to augmented content items or to both augmented and original content items.

The process 300 includes selecting a content item, among the filtered content items, based on the normalized auction scores (block 335). In some implementations, the content item with the highest normalized auction score is selected. In some implementations, the selection is further based on one or more criteria in which case the filtering at block 330 can be omitted. The can be among augmented content items only or among augmented and original content items. The process 300 may further include identifying a second content item (content item with runner up normalized auction score) with second highest normalized auction score and associated with a different original content item then the selected content item.

The process 300 includes identifying a set of content items including the same original content item as the selected content item (block 340). Given the selected content item, the content item selection system 110 identifies a set of content items (for instance based on the filtered content items or all the content items) sharing the same original content item as the selected content item. In other words, in the identified set, all the content items have the same original content item by differ with respect to respective format elements. A person of ordinary skill in the art should appreciate that based on a given original content item, multiple respective augmented content items can be generated based on different combinations of added format elements.

The process 300 includes computing selection scores for the content items in the identified set based on respective normalization parameters (block 345). In some implementations, a selection score for each content item represents the respective cost (such as cost per click or any cost metric) to the owner of the respective original content item if that content item is presented for display and/or acted upon by a user. In some implementations, for each content item in the identified set, the selection score is defined as the respective normalization parameter multiplied by the runner up normalized auction score. In other implementations, the selection scores can be defined differently based on the normalization parameters. For instance a different value than the runner up normalized auction score can be used.

The process 300 includes filtering the identified set based on the selection scores and a bid amount (block 350). In some implementations, the content item selection system 110 can eliminate content items (in the identified set) with respective selection scores exceeding the bid amount set by the owner of the original content item associated with the identified set. In other implementations, a threshold defined in terms of the bid amount can be used to filter the identified set.

The process 300 includes selecting the content item with the highest performance rate among the filtered set (block 355). In some implementations, the content item selection system 110 can select the content item with the highest performance rate among the content items filtered in block 350. In other implementations, the filtering in block 350 can be omitted in which case the selection of the content item with highest performance rate is also constrained by the selection score being smaller than or equal to the bid amount or any corresponding threshold. The performance rate can be the predicted click-through rate (pCTR) or any other performance rate known to a person of ordinary skill in the art.

The auction process described in the process blocks 315-355 can be viewed as a two-stage auction process. In a first stage (blocks 315-335), a first selection of a content item is made based on normalized auction scores. The normalized auction scores provide a meaningful and efficient metric based on which different content items can be compared. In a second stage (blocks 340-355), content items sharing the same original content item with the selected content item are considered. For an owner of an original content item, what matters most is the performance of the content item presented for display to users rather than the features associated with any added format elements. As such, the selection in the second stage is based on the performance rates to satisfy the goal of the owner. Also, in the second stage, the cost to the owner is dependent on any added format elements to guarantee the owner is paying for any added value and to boost the revenue for the content provider.

As described above, the auction process is configured to enhance performance rate (such as click through rate (CTR)), quality of clicks, content item provider profitability, and ensure that content item providers pay for any added formats.

The process 300 includes looping back to the process block 335 until all available display space is used or a number of selected content items has been reached (decision block 360). In case multiple content items are requested, the content item selection system 110 checks whether the available display space in the resource is fully consumed or maximum number of content items was already selected (decision block 360). If the answer is NO, the content item selection system 110 can loop back to block 330. The content item selection system 110 may eliminate the set of content items identified at block 340 from the plurality of content items before looping back to block 330. If the answer is YES at the decision block 360, the content item selection system 110 provides the selected content items at block 355 for presentation to a user (block 365). The content item selection system 110 can provide the selected content items to the resource system 104 or directly to a client device 120 via the network 101. In some implementations, the filtering applied at block 330 may result in no content items left for selection at block 335. In such case, the process 300 can jump from block 330 to block 365 to provide already selected content items for display to the user.

Figure 4:
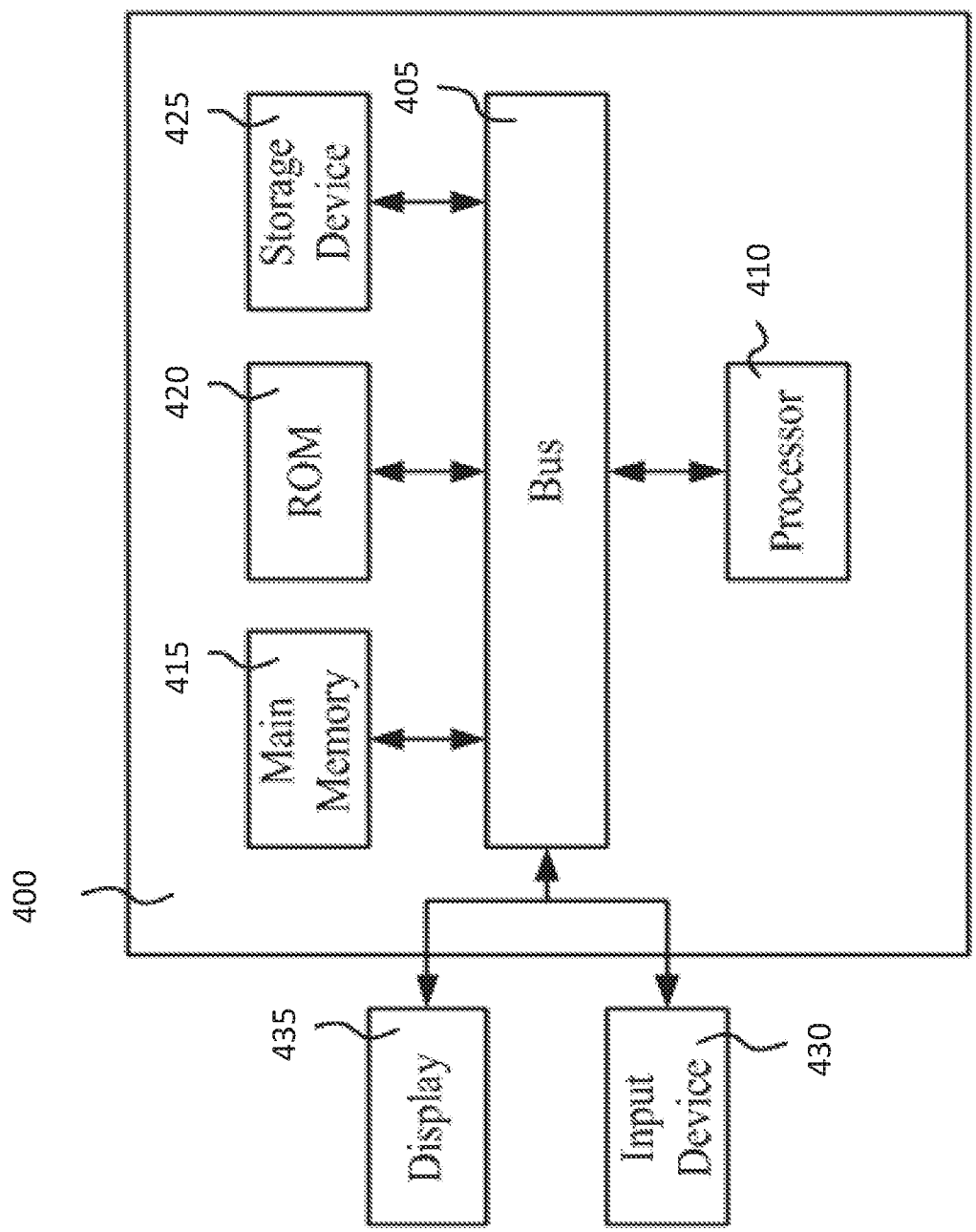
FIG. 4 is a block diagram depicting a general architecture for a computer system that may be employed to implement various elements of the systems and methods described and illustrated herein.

FIG. 4 is a block diagram of a computer system 400 that can be used to implement the client device 120, content item selection system 110, third-party content server 102, resource server 104, etc. The computing system 400 includes a bus 405 or other communication component for communicating information and a processor 410 coupled to the bus 405 for processing information. The computing system 400 can also include one or more processors 410 coupled to the bus for processing information. The computing system 400 also includes main memory 415, such as a RAM or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a ROM 420 or other static storage device coupled to the bus 405 for storing static information and instructions for the processor 410. A storage device 425, such as a solid state device, magnetic disk or optical disk, is coupled to the bus 405 for persistently storing information and instructions. Computing device 400 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 400 may be coupled via the bus 405 to a display 435, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 430, such as a keyboard including alphanumeric and other keys, may be coupled to the bus 405 for communicating information and command selections to the processor 410. In another implementation, the input device 430 may be integrated with the display 435, such as in a touch screen display. The input device 430 can include a cursor control, such as a mouse, a trackball, or cursor direction keys, for communicating direction information and command selections to the processor 410 and for controlling cursor movement on the display 435.

According to various implementations, the processes and/or methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes and/or method steps described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an implementation of a computing system 400 has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A system to provide content items, comprising:
one or more processors; and
one or more storage devices that store a plurality of original audio content items, each of the plurality of original audio content items associated with a bid amount and a plurality of audio format elements, the one or more processors in communication with the one or more storing devices to:
receive a request for a content item;
identify a plurality of augmented audio content items, each augmented audio content item including one of the plurality of original audio content items and at least one audio format element, each augmented audio content item associated with a respective auction score;
normalize, for each augmented audio content item, the respective auction score based on a corresponding normalization parameter defined based on a number of bits indicative of a data amount of the augmented audio content item;

select a first audio content item based on the normalized auction scores, the first audio content item associated with a first original audio content item;

identify a set of audio content items associated with the first original audio content item;

select among the identified set a second audio content item associated with a highest performance rate among audio content items in the identified set; and provide, to a requesting entity, the first original audio content item with any audio format indicated by any audio format element in the selected second audio content item.

2. The system of claim 1, wherein for each augmented audio content item, the corresponding normalization parameter is defined based on a respective user interaction rate.

3. The system of claim 1, comprising:
the one or more processors in communication with the one or more storing devices to retrieve, for each augmented audio content item, the respective auction score from a memory.

4. The system of claim 1, comprising:
the one or more processors in communication with the one or more storing devices to compute, for each augmented audio content item, the respective auction score.

5. The system of claim 1, wherein the auction score for each augmented audio content item is defined based on a performance rate associated with the augmented audio content item and a performance rate associated with the respective original audio content item.

6. The system of claim 1, comprising:
the one or more processors in communication with the one or more storing devices to filter the plurality of augmented audio content items based on at least one criterion.

7. The system of claim 6, comprising:
the one or more processors in communication with the one or more storing devices to filter the plurality of augmented audio content items based on the number of bits indicative of the amount of data associated with each augmented audio content item or based on respective user interaction rates.

8. The system of claim 1, comprising the one or more processors in communication with the one or more storing devices to:
compute a selection score for each audio content item in the identified set based on the respective normalization parameter;
filter the audio content items in the identified set based on the selection scores and a bid amount; and
select from the filtered audio content items a content item with a highest performance rate.

9. The system of claim 8, comprising:
the one or more processors in communication with the one or more storing devices to filter the audio content items by discarding each audio content item with a respective selection score higher than the bid amount.

10. The system of claim 8, wherein the selection score for each audio augmented content item is equal to the respective normalization parameter multiplied by a normalized auction score associated with a third audio content item.

11. A method of providing content, comprising:
receiving, by a processor, a request for a content item, the processor having access to a plurality of original audio content items, each of the plurality of original audio content items associated with a bid amount and a plurality of audio format elements;

identifying a plurality of augmented audio content items, each augmented audio content item including one of the plurality of original audio content items and at least one audio format element, each augmented audio content item associated with a respective auction score;

for each of the augmented audio content items, normalizing the respective auction score based on a corresponding normalization parameter defined based on a number of bits indicative of an amount of data of the augmented content item;

selecting a first audio content item based on the normalized auction scores, the first audio content item associated with a first original audio content item;

identifying a set of audio content items associated with the first original audio content item;

selecting among the identified set a second audio content item associated with a highest performance rate among audio content items in the identified set; and providing to a requesting entity the first original audio content item with any audio format indicated by any audio format element in the selected second audio content item.

12. The method of claim 11, wherein for each audio content item, the respective normalization parameter is defined based on respective user interaction rate.

13. The method of claim 11, comprising:
retrieving, for each augmented audio content item, the respective auction score from a memory.

14. The method of claim 11, comprising:
computing, for each augmented audio content item, the respective auction score.

15. The method of claim 11, wherein the auction score for each augmented audio content item is defined based on a performance rate associated with the augmented audio content item and a performance rate associated with the respective original audio content item.

16. The method of claim 11, comprising:
filtering the plurality of augmented audio content items based on at least one criterion.

17. The method of claim 16, wherein filtering the plurality of augmented audio content items based on at least one criterion includes filtering the plurality of augmented audio content items based on the number of bits indicative of the amount of data associated with each augmented audio content item.

18. The method of claim 11, wherein selecting a second audio content item includes:
computing a selection score for each audio content item in the identified set based on the respective normalization parameter;
filtering the audio content items in the identified set based on the selection scores and a bid amount; and
selecting from the filtered audio content items an audio content item with a highest performance rate.

19. The method of claim 18, wherein filtering the audio content items includes discarding each audio content item with a respective selection score higher than the bid amount.

20. The method of claim 18, wherein the selection score for each augmented audio content item is equal to the respective normalization parameter multiplied by a normalized auction score associated with a third audio content item.

* * * * *